United States Patent [19]

Tucker

[11] 4,248,109
[45] Feb. 3, 1981

[54] PULL TYPE CUT-OFF PRESS

[75] Inventor: Raymon Z. Tucker, Elkhart, Ind.

[73] Assignee: Roll Form Corporation, Elkhart, Ind.

[21] Appl. No.: 68,448

[22] Filed: Aug. 21, 1979

[51] Int. Cl.$^3$ .................... B23D 25/04; B23D 25/16
[52] U.S. Cl. .......................................... 83/37; 83/292; 83/295; 83/320
[58] Field of Search ...................... 83/37, 38, 292–295, 83/318–320

[56] References Cited

U.S. PATENT DOCUMENTS

| | | | |
|---|---|---|---|
| 3,178,974 | 4/1965 | Roess | 83/292 X |
| 3,272,045 | 9/1966 | Cookson | 83/308 |
| 3,299,757 | 1/1967 | Schumacher et al. | 83/293 |
| 3,310,855 | 3/1967 | Orioli | 83/295 X |
| 3,777,602 | 12/1973 | Youra | 83/204 |
| 3,800,645 | 4/1974 | Alcock | 83/320 X |

Primary Examiner—J. M. Meister
Attorney, Agent, or Firm—Cook, Wetzel & Egan

[57] ABSTRACT

An improved method and apparatus for cutting segments from a continuously moving stock piece are disclosed wherein a cut-off press is accelerated to exceed the speed of the stock piece and to substantially eliminate a pushing force by the stock against a positive engagement means. The force of acceleration is reduced and controlled to maintain a minimum bias in the direction of the stock movement by the positive engagement means when the cut-off press attains a velocity equivalent to the moving stock piece. The stock piece is severed into accurate length segments during reciprocal movement cycles of the cut-off press. Back pressure on the stock piece is substantially eliminated by establishing a positive pulling engagement between the cut-off press and the stock piece when moving in the same direction during the reciprocal movement cycles.

13 Claims, 9 Drawing Figures

PULL TYPE CUT-OFF PRESS

BACKGROUND OF THE INVENTION

The present invention relates generally to an apparatus and method for cutting parts from a moving continuous stock, and more particularly, to an apparatus and method of accurate and reproducible cutting of a moving, continuous metal stock of light cross section and gauge.

Modern roll forming machines are capable of producing a continuously moving stock at high linear speeds having from very thick to very light gauge in a variety of cross sectional configurations. As the roll formed product is delivered from the forming machinery, it is conventionally necessary to sever the stock workpiece into parts having predetermined lengths by an associated cutting device. While roll forming machines can be employed to shape many different products, a problem of accurately cutting a stock piece which is easily deformable by an associated cutting device has not heretofore been satisfactorily solved. When light gauge strip material is roll formed, it is often desirable to pre-punch finish work openings into the strip of material prior to roll forming which remain in the severed part. Consequently, it is often necessary to accurately and reproducibly cut roll formed stock which has finish work openings in such a manner as to maintain the accuracy of the spacing of the finish work in the severed part.

Several conventional methods and apparatus are known and employed in the field of cutting roll formed stock. One method employs a cut-off press coupled to a positive engagement length stop which is physically engaged by the end of the moving stock piece. The moving stock piece must have a heavy gauge or sufficient lateral and transverse strength to be able to push the cut-off press directly along with the stock. At a preselected length from the edge of the stock, a limit switch is tripped causing the moving press to cut transversely through the stock piece. The press and length stop assembly is returned to its starting point and will again be engaged and pushed by the moving workpiece. This method is unsatisfactory for light cross sectional, light gauge roll formed stock which will easily deform or buckle by the back pressure or shock of engaging a limit stop and pushing a press bed. When the press bed is pre-accelerated at a slower speed than the speed of the roll formed product, the stock piece will also be deformed by encountering the shock and back pressure of having to push even a pre-accelerated press.

Another method employs a flying trip switch in place of a limit stop, at a predetermined spacing from either a stationary or pre-accelerated press bed. However, embodiments employing this method are not accurate to close tolerances. Electrical and mechanical variations cause response time delays preventing reproducability of part length. Any finish work, such as notching or punching, must be performed on the part after it has been roll formed and cut by this method.

Other methods are known which eliminate positive engagement with a limit stop and employ an accelerated press bed. A complicated electro-hydraulic system is employed to monitor the line speed in an attempt to provide an accurate end cut-off press and compensate for the variations in the line speed of the roll formed product. Those systems are unsatisfactorily subject to accumulated errors and inaccurate parts as a result of variations in mechanical and electrical factors which cannot be controlled such as press response time fluctuations.

In view of the prior art, a need currently exists for an improved method and apparatus for end-cutting accurate and reproducable part lengths from an easily deformable roll formed stock of light cross section and/or light gauge.

OBJECTS OF THE INVENTION

An object of the present invention is to reproducibly cut finished parts by maintaining a predetermined spaced relationship between positive indices in a moving stock piece to eliminate accumulated error in the part length.

An object of the cut-off apparatus and method of the present invention is to sever an easily deformable moving stock piece while applying a pulling force to the stock piece, thereby maintaining a predetermined spaced relationship between the cutting means and a pick up means engaged with one of the indices in the moving stock piece. A further object of the present invention is to reproducably cut finish parts from an easily deformable stock piece by compensating for response delays due to mechanical and electrical fluctuations.

An additional object of the present invention is to provide a cutting means which is accelerated from a stationary position at a rate which can be selectively controlled to provide a speed faster than the line speed of the stock. It is a further object of the invention to substantially eliminate back pressure which would buckle an easily deformable moving stock piece.

A further object of the present invention is to provide a method and apparatus for cutting an easily deformable work piece having a series of indices by positively engaging an indice without buckling the moving stock piece. Another object of the present invention is to control the rate of the pre-accelerated cutting means to maintain a selectively controllable pulling pressure on the forward side of an indice in the moving stock piece thereby maintaining a reproducible spaced relationship between a pick up means and the cutting means during successive cutting cycles.

SUMMARY OF THE INVENTION

A method and apparatus is disclosed for accurately cutting part lengths from a moving, easily deformable stock piece. A cutting press and a pick up means are accelerated from a first stationary position to the speed of the moving stock piece at a second position in response to positive engagement of a biased finger in the pick up means with one of the series of spaced indices in the stock piece. The cutting and pick up means are accelerated to a speed greater than the speed of the stock piece. When the stationary pick up positively engages an indice in the moving stock piece, there will be a brief lag time when the slower moving finger is momentarily engaged by the rearward face of the indice. The pick up means is biased to substantially eliminate a pushing force in the reverse direction of the stock piece to prevent buckling of the easily deformable stock piece during the brief lag time at the beginning of the acceleration cycle. When the speed of the press and pick up means exceeds the velocity of the stock piece, the pick up finger is brought from engagement with the rear face into engagement with the forward face of the indice. The acceleration force is reduced and controlled to provide a minimum bias in the direction of the stock movement by the pick up finger. The stock piece is severed into an accurate length segment with no relative movement between the stock piece and the cutting press. The length of the segment is thus controlled by the pick up finger biased into engagement with the forward face of the engaged indice. The pick up finger is disengaged and the pick up and cutting press are returned in an opposite direction to their first stationary positions after the segment has been severed from the stock piece.

BRIEF DESCRIPTION OF THE FIGURES

The present invention may be better understood in connection with the following detailed description and in regard to the accompanying drawings, of which.

DETAILED DESCRIPTION OF THE PREFERRED EMBODIMENTS

The various aspects of the present invention will first be described in general terms followed by a more detailed description as will be indicated below. While the invention is susceptible of various modifications and alternative forms, certain specific embodiments thereof have been shown by way of example in the drawings which will be described in detail herein. It should be understood, however, that it is not intended to limit the invention to the particular forms disclosed but on the contrary, the invention encompasses all modifications, equivalents and alternatives falling within the spirit and scope of the disclosure herein.

Figure 1:
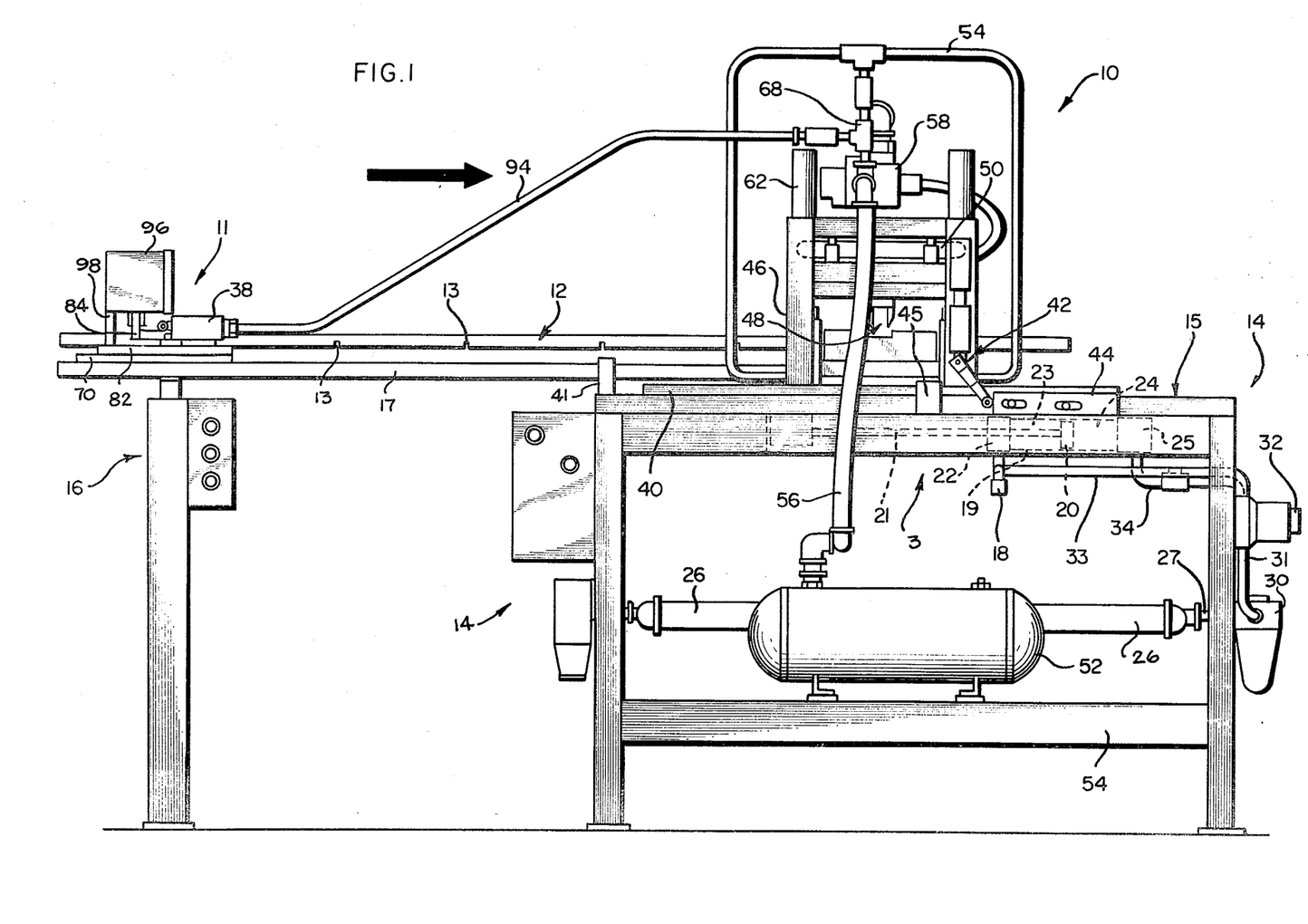
FIG. 1 is a side elevation of an apparatus embodying the invention for accurately cutting parts of a determined length from a moving stock piece.
Figure 2:
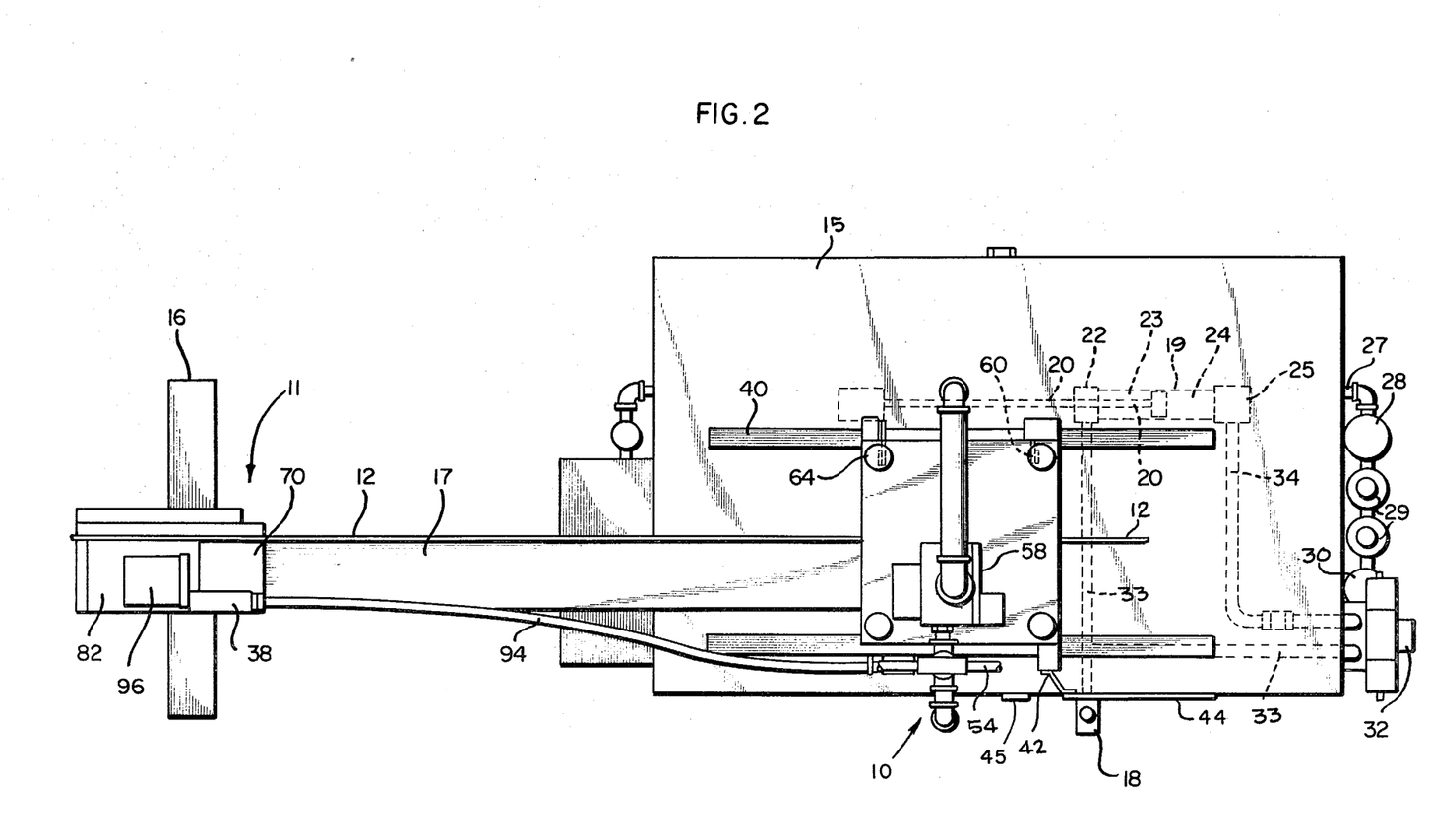
FIG. 2 is a top view of the embodiment shown in FIG. 1.
Figure 3:
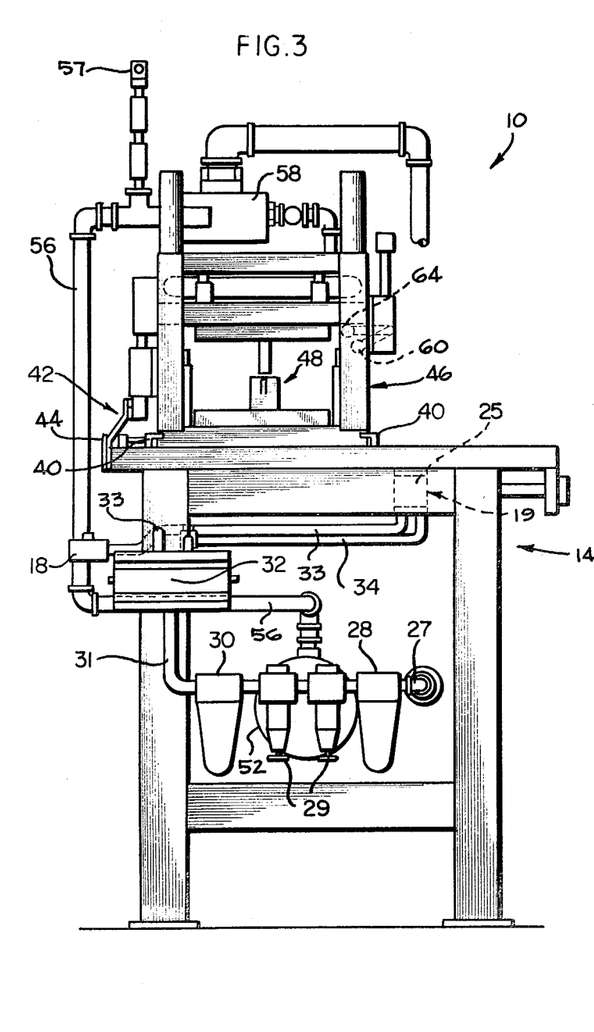
FIG. 3 is an end perspective view of the embodiment shown in FIG. 1.

An exemplary embodiment of a cut-off press is shown generally in FIGS. 1 to 3, employing various aspects of the present invention, and includes a cutting means, shown as a press 10, associated with a pick up means shown as a pick up assembly 11, in a spaced relationship therefrom. A stock piece 12 exits from a roll forming machine (not shown) at a substantially constant rate in the direction indicated by the arrow. The pick up assembly 11 cooperates for repeated engagement with and disengagement from a series of spaced indices 13. The press 10 and pick up assembly 11 are coupled by a bracket 17 in a predetermined multiple of the distance between spaced indices 13 which has a direct relationship to the length of the segment cut from the moving stock piece 12.

Prior to engagement of an indice, the pick up assembly 11 is spaced on the bracket 17 a desired distance from the press 10 in their respective first, stationary positions relative to the moving stock 12. The pick up assembly 11 and press 10 remain in their respective stationary positions until one of the indices 13 is positively engaged by the pick up assembly 11. After such positive engagement, the press 10 and the coupled pick up assembly 11 are accelerated in the direction of material flow to a second position. After a part length segment is cut from the end of the stock piece 12, the direction of travel of the press 10 and pick up assembly 11 is reversed at the second position, to return to their respective first positions with the pick up assembly 11 disengaged. Thereby, a part is severed from the stock piece 12 during a cycle of reciprocal movement of the pick up 11 and press 10. Engagement of the pick up assembly 11 with another of the indices 13 begins another reciprocal movement and in this manner the stock piece 12 will be repeatedly severed into the desired length segments.

Figures 5, 7:
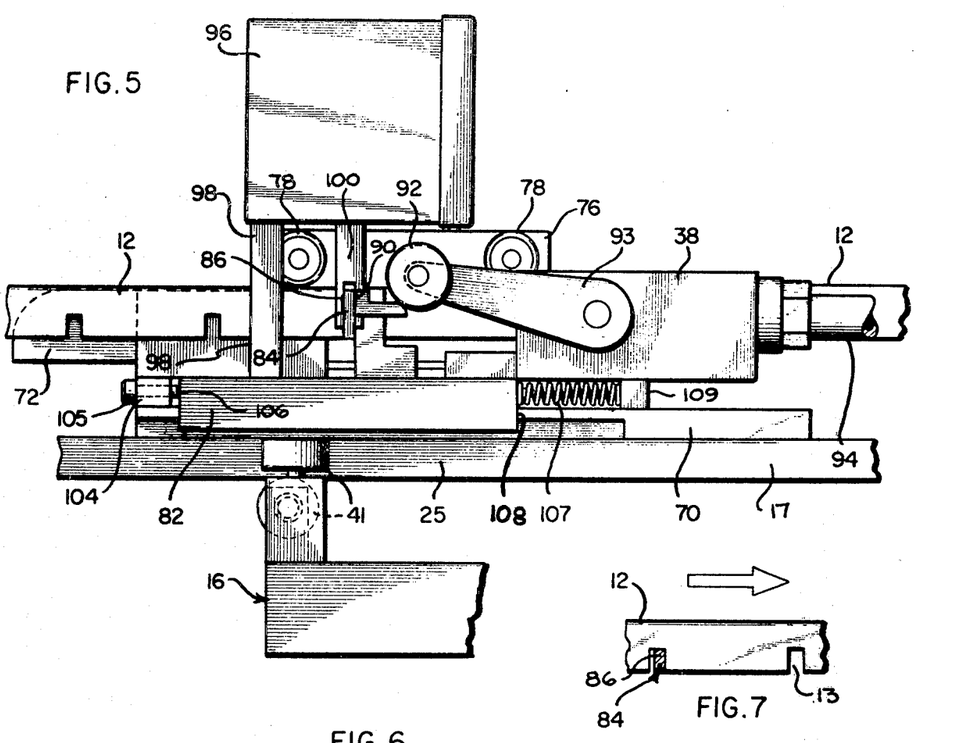
FIG. 5 is a side perspective view of an embodiment of the positive pick up means shown in FIG. 4.
FIG. 7 is a partial, sectional view along line 7—7 of FIG. 6 illustrating positive engagement of an embodiment of a pick up member on the forward side of an indice in a moving stock piece.

As will be discussed more fully below, the pull type apparatus of the present invention accurately severs the moving stock piece 12 chich has been roll formed from very light gauge materials. As indicated by the arrow in FIG. 1, the driving force for the stock 12 is continuously provided for by the roll forming machine (not shown). The present invention is a pull-type cut off in the sense that a finger 84 of the pick up assembly 11 is engaged on the forward side of the indice when the stock 12 is cut as shown in FIG. 7. The finger 84 is snugly seated on the forward side of the indice by a selectively controlled force in the direction of the moving stock piece. It is this biased force which accurately maintains that the predetermined distance between the coupled pick up assembly 11 and press 10 by insuring that the engagement finger 84 is seated on the forward side of the indice at the time the precise length segment is cut from the stock 12.

A stock piece of light gauge material is easily deformed or buckled if it encounters even slight resistance to or back pressure in the direction opposite to the material flow. The facility with which the roll formed stock can be deformed is a function not only of the gauge or wall thickness of the roll formed stock, but is also a function of the cross sectional configuration of the stock. Generally, a roll formed part which has a higher number of creases resulting in a higher density per square unit of measurement will be less easily deformable and therefor have greater linear and transverse strength to resist buckling. The present apparatus and method is advantageous for cutting such roll formed stock into window pane borders, screen borders, fireplace frames and other stock of light cross section and/or gauge as will be recognized by those skilled in the art.

A means for accelerating the press 10 is shown generally as a fluid actuator 3 in FIGS. 1 and 2. The actuator 3 is suitably coupled as shown to the press 10 and reciprocally moves the press 10 and the pick up 11 which is coupled thereto by the bracket 17. The present invention further provides a means for selectively controlling the force of acceleration exerted by the actuator cylinder 3, such as a bleed valve 18, shown in fluid communication with the actuator 3.

In the illustrated embodiment of FIGS. 1 to 3, there is provided a means for supporting the press 10 and pick up 11 which includes a table 14 having a horizontal support surface 15, and a separated support 16.

The accleration means shown as the fluid operated actuator 3, incldues for example, a cylinder 19 having an internal piston 20 which is rectilinearly movable therein by fluid pressure as illustrated in FIGS. 1 and 2. A connecting means, shown as a rod 21, extends through a fluid seal (not shown) at one end 22 of the cylinder 19. A fluid cavity 23 is defined between one end 22 of the cylinder 19 and the piston 20 and another cavity 24 is similarly defined between the other end 25 of the cylinder 19 and the piston 20.

The rod 21 is attached to the piston 20 at one end and is attached at its other end to the press 10 by suitable means to reciprocally move the press during fluid actuation of the piston 20 in cavities 23 and 24 within the cylinder 19.

A stream of fluid, such as compressed air, for the acceleration means is suitably received by a preliminary storage tank 26. The tank 26 is coupled via conduit 27 to an air filter, and water trap 28 which is coupled to pressure regulators 29 and to a lubricator 30 for pretreatment of the compressed air. The treated fluid or air stream is directed via conduit 31 to a suitable means for controlling the fluid stream, such as a double solenoid valve 32, into and out of cavities 23 and 24.

As shown in FIGS. 1, 2 and 3, the air valve 32 directs the fluid or compressed air to the forward cavity 23 of the cylinder 19 by conduit 33 to provide pressure on the internal piston 20 forcing the rod 21 to transmit the motion to accelerate the press 10 in the direction of the material flow. A return fluid conduit 34 suitably coupled to the opposite end 25 of the cylinder 19 and to the air valve 32 provides for the escape of fluid pressure from the cavity 24 during the acceleration of the press 10 by the air valve 32 directing the fluid stream to the forward cavity 23. When a second position is reached, as will be discussed below, the air valve 32 will reverse the fluid stream to the cavity 24 via conduit 34 and simultaneously exhaust the fluid from cavity 23 via conduit 33 thereby returning the press 10 to the starting position in the opposite direction of the stock piece 12.

As will be discussed more fully below, the pick up assembly 11 illustrated in FIGS. 1 and 2 is provided with a means for actuating the air valve 32, shown as a limit switch 38. When positive engagement is established between the biased index finger of the pick up assembly 11 and one of the indices 13, the limit switch 38 activates the double solenoid valve 32 to direct the fluid stream into conduit 33 thereby initiating the acceleration of the press 10.

According to another aspect of the invention referred to above, the acceleration force is controlled by the bleed valve 18 as is illustrated in FIGS. 1 to 3. The bleed valve 18 is in fluid communication with the fluid stream in the forward conduit 33. The rate of acceleration of the press 10 and pick up assembly 11 is a function the pressure of fluid reaching cavity 23 via conduit 33. The valve 18 controls the acceleration rate by regulating the amount of fluid delivered to the cylinder 19 by adjustably bleeding the fluid from conduit 33. Pressure within the cavity 23 is selectively controlled to regulate the force of acceleration imposed on the press and the biasing force imposed by the pick up finger on the stock piece.

Figure 4:
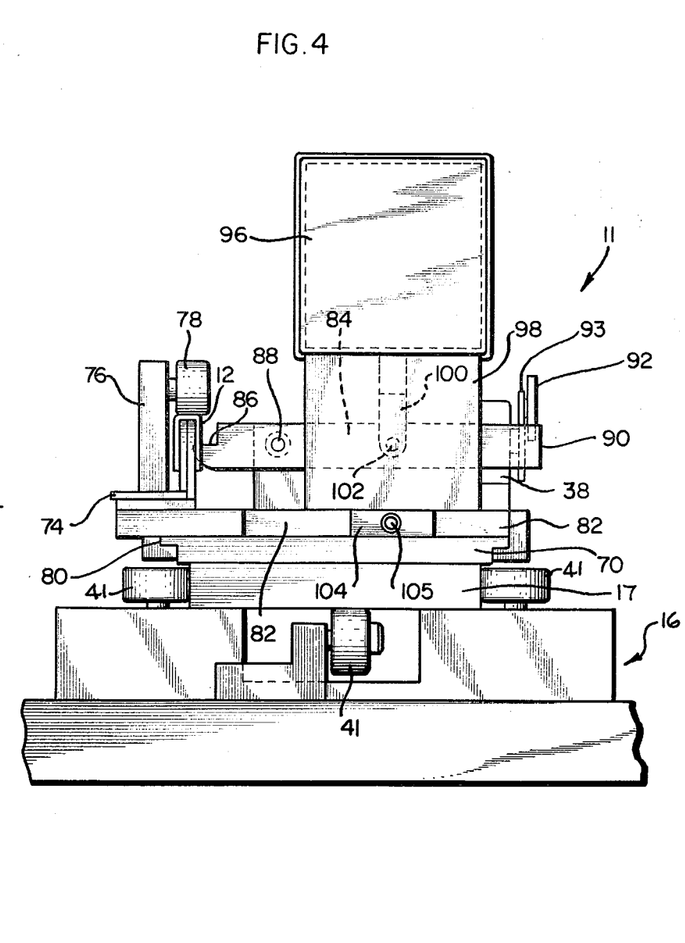
FIG. 4 is an enlarged end perspective view of a positive pick up means illustrating more detail of the indicated portion of the embodiment shown in FIG. 1.

The press 10 is accelerated in the direction of movement of the stock 12, along the table surface 15, within two suitable guide rails 40 as shown in FIGS. 1 to 3. Suitable rollers 41 are provided in the support 16 as shown in FIGS. 4 and 5, and on the press table 14 to support the bracket 17 as it moves with the pick up assembly 11 in a spaced relationship from the press 10.

The press 10 has mounted thereon means for actuating the press to cut a segment from the stock, shown as a limit switch 42. A stop plate 44 is suitably mounted to the table surface 15 and is longitudinally adjustable to cooperate with the limit switch 42. As mostly clearly depicted in FIG. 1, the limit switch 42 is activated by its striking the stop plate 44 at a selected point of travel of the press 10.

The method and apparatus of the present invention contemplates the use of a variety of cut-off means, within the scope of the present invention. According to this aspect of the invention, a pneumatically operated press bed 46 is provided for the embodiment shown in FIGS. 1 and 3. A die set 48 is mounted for transverse movement within the bed 46 by a fluid activator, such as an air bag 50. A storage tank 52 for the compressed fluid is suitably mounted on a cross support 54 within the table 14. A conduit 56 carries the compressed fluid from the storage tank 52 to a suitable valve means, shown as a poppet valve 58. When the switch 42 is tripped by the stop 44 during the movement cycle, the poppet valve 58 is activated causing a large volume of compressed air to inflate the air bag 50. Inflation of the air bag 50 forces the die set 48 vertically within the press bed 46 to sever the stock piece 12. As shown in FIG. 2 at the bottom of the stroke of the die set 48, a limit switch 60 is tripped, deactivating the poppet valve 58, as well as causing the pick up finger 84 in the assembly 11 to disengage the stock piece 12, as discussed below. The die assembly 48 is returned to the top of its stroke by biasing springs 62 connected thereto. At the top of its stroke, a limit switch 64 is tripped activating the double solenoid valve 32 to direct compressed fluid to the press return conduit 34 and to the cavity 24 of the cylinder 19. The press 10 is returned and the limit switch 42 will suitably re-activate the pick up finger 84 to engage another indice 13 by maintaining contact with plate 44 or by making a stop plate 45.

The table 14 preferably has means to substantially reduce friction between the press bed 46 and the horizontal table surface 15, such as an air cushion provided in a conventional manner by conduit 57. The conduit 57 receives fluid from storage tank 52 by the conduit 56 by a suitable coupling 68 prior to reaching the poppet valve 58. The fluid cushion is created between the press bed 46 and table surface 15 by directing the fluid stream in the conduit 57 to a plurality of vents (not shown) on the underside of the press bed 46.

Figure 6:
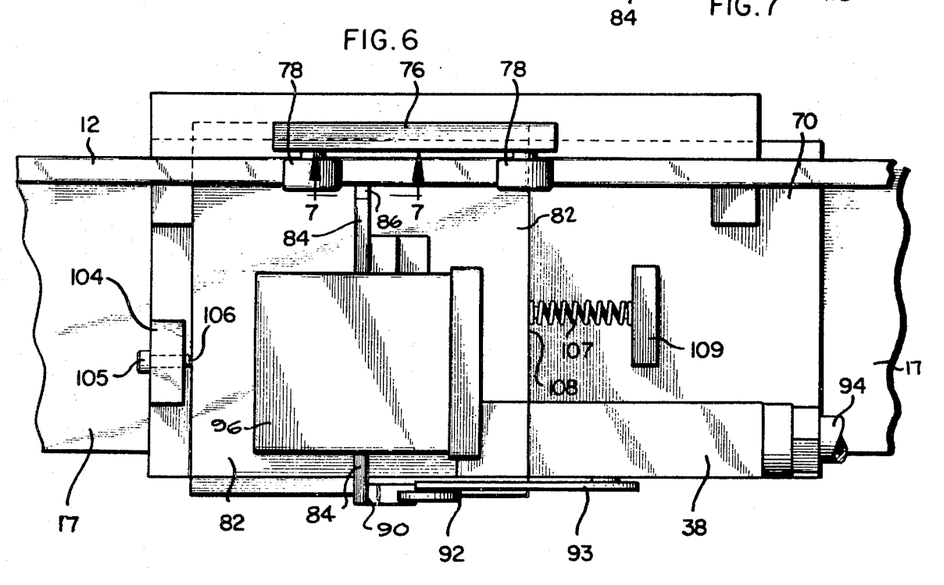
FIG. 6 is a top view of the embodiment of the positive pick up means shown in FIG. 5.

Turning now to the pick up assembly 11 shown in FIGS. 4, 5 and 6, a base platform 70 is adjustably mounted in a stationary position on the bracket 17. For the particular roll formed moving stock piece 12 as illustrated in FIGS. 4 and 5, a suitable guide member 72 having an appropriate configuration to receive the moving stock piece 12 is secured to the platform 70 by a bracket 74. A post 76 having mounted thereon a roller assembly 78 is secured to the platform 70 to further guide the moving stock piece 12. The platform 70 is provided with suitable means for defining a slide path, shown as an overhung lip 80, guide rails, or any suitable means. A slide plate 82 cooperates with the platform as shown.

In the illustrated embodiment of FIGS. 4 to 6 the pick up finger 84 has one end 86 adapted to engage a particular indice of the moving stock piece 12. The finger 84 is suitably mounted about a pivotable axis 88 to a bracket 98 which is secured to the slide plate 82 as shown in FIG. 4. The other end 90 of the finger 84 is adapted to trip a roller 92 and lever 93 of the limit switch 38 which is electrically coupled to the valve 32 (as shown in FIGS. 5 and 6). A solenoid 96 mounted by the bracket 98 to the slide plate 82 has a connecting rod 100 projecting therefrom pivotably connected to the finger 84 about an axis 102 as shown. The solenoid 96 provides a biasing force to disengage the finger 84 from the indice 13 when switch 60 is tripped after the length segment has been cut to permit the return of the press 10 without buckling the stock when switch 64 is tripped. When the press 10 is returned, the return side of switch 42 de-activates the solenoid 96 thereby biasing the finger to await engagement of another indice.

The slide plate 82 enables the finger 84 to slide or float longitudinally along the pre-travel slide path with respect to the pick up means 11 to limit the forces imposed on the rear face of the indice in the stock piece 12 when first engaged by the finger 84 to the time the entire pick up assembly 11 reaches the speed of the moving stock 12 during the acceleration cycle. The initial position of the finger 84 is set with respect to the pick up 11 by an end plate 104 mounted on the base platform 70. An adjustable set screw 105 defines a dead stop end 106 of the slide path by abutting against the slide plate 82, as illustrated in FIG. 6. The slide plate 82 is biased at its other end 108 to normally abut the screw 105 by a compressed coil spring 107 mounted between the slide plate 82 and a fixed stop 109 secured to the base platform 70. The slide plate 82 is preferably carried on an air cushion between its lower surface and the base platform 70 to reduce friction. The cushion is supplied with air via conduit 94.

Figure 8:
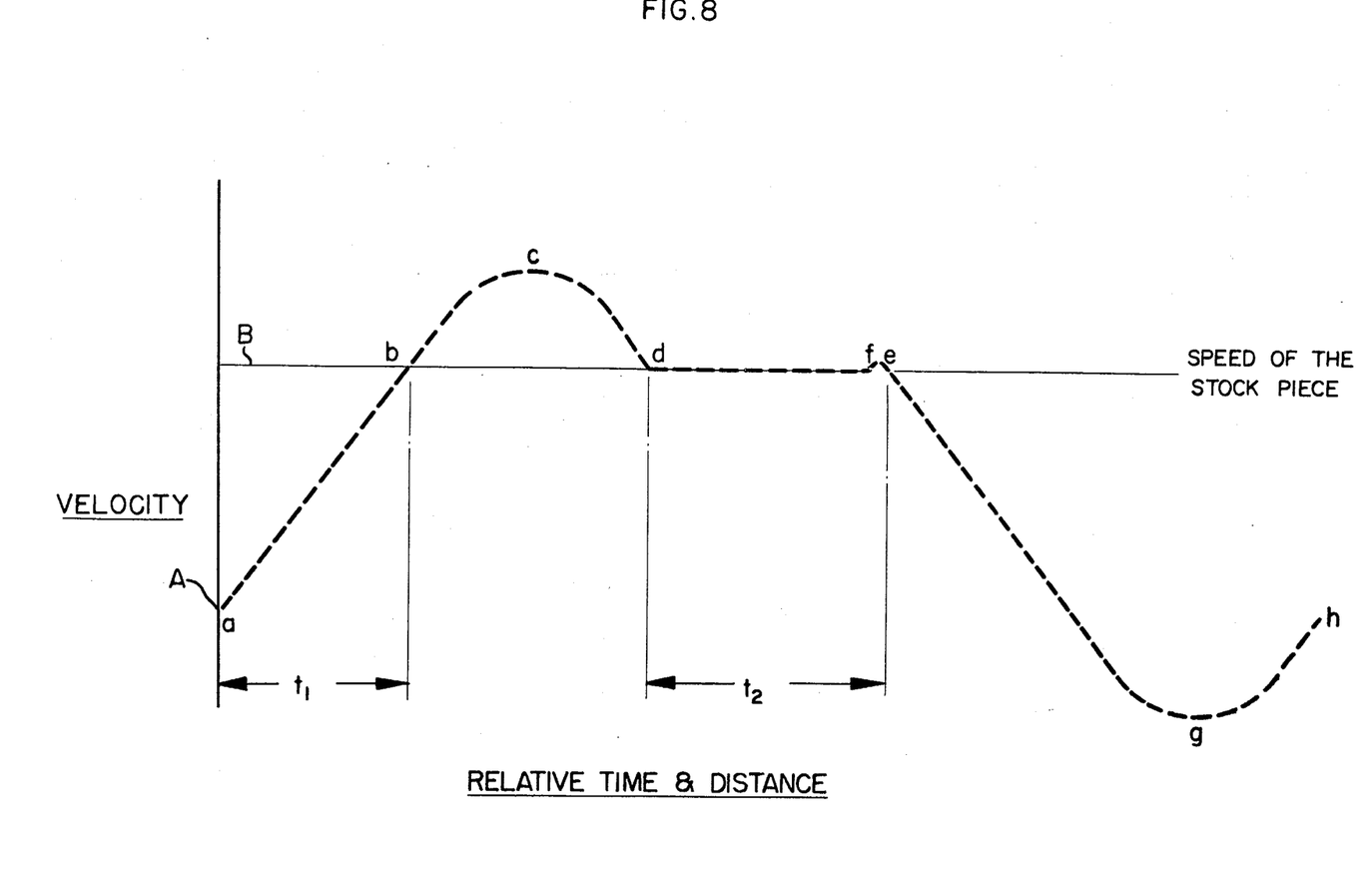
FIG. 8 is a graph of time versus velocity, illustrating an acceleration cycle of the pick up and cutting means.

A complete understanding of the operation of the present invention requires an understanding of the relationships between the acceleration means or the actuator 3, the acceleration controlling means or bleed valve 18 and the pick up assembly 11. Referring to the graph of FIG. 8, depicted therein by the dotted line A is a plot in qualitative terms of the change of speed of the pick up assembly 11 and the press 10 during one complete movement or acceleration cycle in comparison to the relatively constant speed of the moving stock piece 12 depicted by line B. FIG. 8 is to depict a typical time-speed curve as an aid in understanding the present invention and is not meant to be illustrative of quantitive values.

Referring generally to FIGS. 1 and 8, there will be a momentary lag upon positive engagement of the pick up finger 84 biased by the solenoid 96 into engagement with an indice. As shown in FIG. 8, the acceleration cycle is initiated at point a immediately before the solenoid valve 32 activates the acceleration cylinder 19 to begin the acceleration of the press bed 46 and the pick up assembly 11. During this momentary lag, the pick up finger 84 will travel with the stock piece within the pre-travel slide path without buckling the stock piece. Specifically, the rear side of the moving indice will engage the pick up finger 84 during the time the speed of the pick up assembly 11 and press 10 is increasing in going from points a to b on the graph. As shown at point b in FIG. 8, after a brief time $t_1$ the speed of the press 10 and pick up 11 will equal that of the moving stock piece 12.

Referring momentarily to FIG. 6, at the time when the acceleration and the movement cycle begin, the rear surface of the indice will push the finger 84 affixed to the slide plate 82 by bracket 98 in a forward direction away from dead stop screw 105 within the pretravel slide path, but without substantial resistance or back pressure to the stock piece 12. The graph of FIG. 8 illustrates the time by $t_1$ in going from points a to b during which the rear surface of the indice will push the pick up slide plate 82 within the slide path. It will be understood that while the pick up assembly 11 and press bed 48 are moving in the direction of the stock piece 12 over the time interval $t_1$ of FIG. 8, the slide plate 82 will also be longitudinally moved within the slide path relative to the stationary platform 70 affixed to the bracket 17. The only resistive force or back pressure encountered by the rear surface of the indice abutting the finger 84 is that composed by the initial weight or mass of the slide plate 82 and by the compressing of the spring 107 as will be understood by reference to FIGS. 5 and 6.

The acceleration rate or slope of the velocity curve in FIG. 8 over time $t_1$ is selectively adjusted by providing a desired flow rate to and/or pressure in the cavity 23 of the cylinder 19. As will be apparent to those skilled in the art, the amount of air pressure or hydraulic fluid flow rate required will be a function of such factors as the speed of the stock piece, the length of the part to be cut, the distance the press and pick up travel prior to severing the stock and the size of the acceleration cylinder, the size and weight of the press, and other factors, such as friction losses encountered.

At the intersection of lines A and B at point b during the forward movement in the acceleration cycle, the rear of the indice is no longer longitudinally pushing the finger 84 and the slide plate 82 within the pre-travel slide path. As acceleration continues, the instantaneous speeds of the finger 84 and the pick up assembly 11 exceed the speed of the stock piece 12 in going from point b to point c and during the de-acceleration from point c to point d of FIG. 8. Once exceeded at point b, the finger 84 leaves the rear side of the indice and is floating in a forward direction disengaged from the rear and front surfaces of the indice until point c. Simultaneously, the slide plate 82 will be biased by the spring 107, which was compressed by the pre-travel movement, in an opposite direction along the fixed platform 70 to its dead stop position abutting screw 105 as graphically illustrated in going from approximately point b to just prior to point d of FIG. 8.

When the finger 84 engages the forward surface of the indice at approximately point c the bleed valve 18 purges some of the fluid stream away from cavity 23 slightly de-accelerating the press 10 and pick up assembly 11 from point c to point d. At point d, the speeds of the pick up assembly 11, the moving stock 12, and the press 10 are all equal. The bleed valve 18 controls the fluid stream reaching the cylinder 19 to terminate acceleration and to also maintain a pulling or biasing force by the finger 84 on the forward side of the engaged indice in going from point d to e of FIG. 8. If the bleed valve is not properly adjusted to purge a sufficient amount of the fluid stream, the acceleration rate will be too large and the pulling force will be too great; this will stretch the stock piece or indice resulting in an inaccurate part length. If the rate of acceleration is too slow of if the bleed valve is exceesively purging, the finger 84 will uncontrollably float within the indice which will result in inaccurate severed length segments.

The bleed valve 18 is adjusted for the strength of the indice so as not to destroy the accurate reproducibility of pulling pressure by the pick up finger 84 against the stock piece. The press 10 and pick up assembly 11 will be accurately spaced along the stock piece 12 as measured from the die set 48 to the dead stop screw 105 and the forward edge of the indice while moving along the table top 15 at the same velocity as the stock 12 from point d to point e of FIG. 8.

As the movement of the press continues along the table surface 15 from point d to point e, the limit switch 42 is tripped by the stop plate 44, activating the poppet valve 58 causing the die set 48 to transversely sever the stock piece at approximately point f in FIG. 8. Limit switch 60 is tripped causing the finger 84 to disengage the stock piece 12 releasing the pulling engagement with the stock piece. The force which had maintained a biased engagement will cause the press to begin to slightly accelerate from point f to point e after the end of the stock piece has been severed.

The press and pick up assembly will continue moving forward to their respective second positions shown as point e in FIG. 8. While traveling from point f to e, the limit switch 64 is tripped by the return of the die set 48 to its upward position as is illustrated in FIG. 2. The valve 32 reverses the flow of fluid to the cylinder 19 as described above. At point e, the direction of travel of the press and pick up assembly is reversed by the fluid stream entering cavity 24 of the cylinder 19 as shown by the negative slope of acceleration from points e to g of FIG. 8. The movement cycle of the pick up assembly 11 and press 10 is completed when the press and pick up means reach their respective first stationary positions as depicted at point h. Engagement of another indice will cause a repetition to the reciprocal movement cycle as described above.

As will be understood by those skilled in the art, electrical and mechanical response time fluctuations will cause slight variations in the time of and the distance traveled by the press 10 thereby changing $t_2$ of FIG. 8 from one movement cycle to the other. To eliminate accumulated errors and inaccuracies in the length segments, preferably, the apparatus of the present invention is adjusted to provide for at least a few inches of travel where the finger 84 is in biased engagement with the forward side of an indice during the interval $t_2$. The interval $t_2$ will be sufficiently long to insure that the stock piece is repeatedly and accurately severed from the stock piece.

Although not illustrated in the figures, it is well known in the roll forming art that indices can be accurately pre-pierced at predetermined intervals in a piece of flat metallic stock prior to roll forming. In this manner, the moving stock piece 12 has a series of indices 13 spaced accurately at predetermined intervals. The length of the segment repeatedly severed from the end of the stock piece 12 can be equal to the distance between the forward faces of two successive indices 13, or any multiple thereof, as measured between the engaged finger 84 of the pick up assembly 11 to the press 10. The distance of the pick up assembly 11 along the bracket 17 from the press 10 will remain constant during the reciprocating movement cycles so that when the pick up finger 84 is engaged with the forward side of an indice, the length segment of the stock 12 therebetween will be constant in moving to the second position in the cycle when the stock 12 is severed.

The positive pick up assembly 11 is adjustable along the bracket 17 to vary the distance between the assembly 11 and press bed 10. The desired part length requires proper spacing between the indices, and the appropriate spacing of the pick up 11 from the press 10 along the bracket 17 and a proper length of the travel path on table 15 which will be a function of such factors as the rate of speed of the roll formed stock 12 and the adjustment of the pressure to the cylinder 19 and the setting of bleed valve 18.

When the present invention is designed for end-cutting parts of relatively short length, the coupling bracket 17 between the press bed 46 and pick up assembly 11 will be such that the length of surface 15 of table 14 alone may be sufficient. However, when a cut-off press is required to be adaptable for longer parts, the additional support brace 16 may be provided to support the end of a longer bracket 17 as illustrated in FIGS. 1 to 5. The roller means 41 may be suitably adapted to the table 14 as shown in FIG. 1 and support 16 is shown in FIG. 4 to guide the bracket 17 which reciprocates with the press bed 46.

An operating example of the present invention will now be described with reference to the schematic drawing of FIG. 9. Although not shown, it will be understood from the foregoing that as the roll formed stock leaves the roll forming machine, it will be appropriately guided along the edge of the pick up member which is in alignment with the press.

Figure 9:
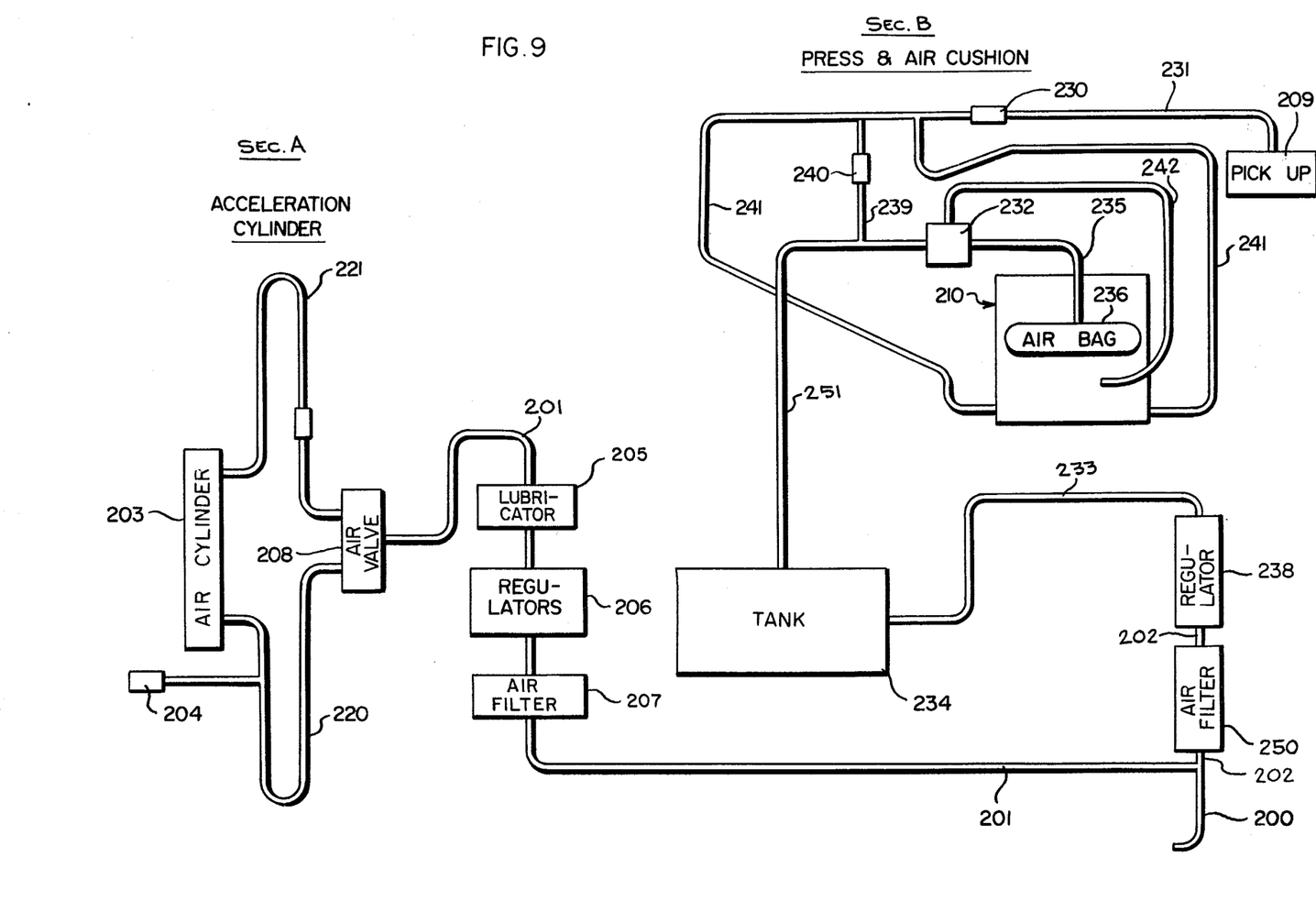
FIG. 9 is a diagrammatic view illustrating a schematic for a fluid operated acceleration and cutting apparatus.

FIG. 9 illustrates a pneumatic system which has been schematically divided into sections A and B. Compressed air or hydraulic fluid enters a line 200 which is plit into lines 201 and 202. Line 201 carries a source of the fluid stream to section A of the figure. Section A depicts in this case a pneumatically operated acceleration means or airy cylinder 203, and a means for selectively controlling the rate of acceleration and biasing force, depicted as a bleed valve 204. Compressed air from line 201 is pretreated by lubricators 205, air filter 207, and regulator 206. The regulator is set to provide about 20 psi pressure to the air cylinder 203 and can be varied as a function of the speed of the moving stock piece, with higher speeds requiring higher pressures for faster acceleration. The bleed valve 204 controls the pressure reaching the air cylinder 203 and is adjusted appropriately as a function of the speed and cross section or strength of the stock piece.

A source of compressed fluid from line 202 enters section B of FIG. 9 which generally illustrates a pick up assembly 209 and a means for cutting the stock or press 210. A source of fluid is received through a filter 250 and a regulator 238 through line 233 to a storage tank 234. It will be understood that the pick up means 209 is suitably biased in a first stationary position to engage an indice of the moving stock piece to be severed.

In its first stationary position, the pick up means 209 is awaiting engagement with one of the indices which is progressively moving towards it. When the pick up means 209 engages an indice, an appropriate limit-switch (not shown) is tripped activating the air valve 208 shown in section A of FIG. 9. Compressed fluid will enter line 220 and simultaneously air will be exhausted through lines 221 and 222. In this manner, the cycle of acceleration of the cutting means 210 and the pick up means 209 is initiated by the acceleration cylinder 203. After the pick up means 209 has positively engaged an indice, there will be a momentary lag in actuating the acceleration cylinder 203 due to electrical, mechanical and pneumatic response times. During this momentary lag between the period when the pick up means 209 is going from its first, stationary position to a rate of speed where it is moving faster than the rate of the engaged, moving indice, the pick up means is moved rectilinearly within a slide path without introducing such back pressure to the engaged indice as would buckle the moving stock piece. To substantially reduce friction of the pick up means 209 during the pre-travel slide thereof, an air cushion can be introduced and regulated from valve 230 and through line 231 as shown in section B in FIG. 9.

The bleed valve 204 reduces and regulates the amount of pulling force in the cylinder 203 when the speed of the press 210 and pick up assembly 209 becomes equal to that of the moving stock piece. The bleed valve 204 is suitably adjusted to control the air cylinder 203 by exhausting excess pressure from line 220. In this configuration, the press 210 is moving at the same speed as the stock in a predetermined space relationship from the pick up means 209 which now is snugly seated on the forward side of the indice.

The length of travel of the press 210 and the pick up 209 engaged on the forward side of an indice should be at least a few inches to compensate for mechanical, pneumatic, and electrical response time fluctuations. By providing a sufficient length and time of joint travel, and with the pick up means 209 accurately spaced from the press 210, the stock piece will be reproducibly severed from cycle to cycle to tolerances of ±0.002 inches.

After the system has attained accurate spacing by bleeding off excess pressure from the cylinder 203, the moving system will make a limit switch thereby energizing a valve 232. The valve 232 opens passing the fluid stream from the tank 234 by a line 251 through a line 235 thereby inflating an air bag 236 causing the press 210 to sever the stock piece at a spaced relationship from the forward edge of the engaged indice. The amount of pressure in storage tank 234 is controlled by the regulator 238 and is dependent upon the gauge of the work piece to be cut, generally in the range of 35 to 40 psi. Then the stock piece is severed, another limit switch or series of limit switches will be tripped de-energizing the valve 232 to exhaust the air from the air bag 236 via line 235 and 242 in section B and to reversibly activate the air valve 208 in section A of FIG. 9 to introduce compressed air into line 221 and simultaneously exhaust air from lines 220 and 224. When the air valve 208 is activated, the stock piece has been severed and the linear motion in the direction of the stock of the pick up 209 and cutting means 210 will terminate at their respective second positions and be returned by cylinder 203 to their respective first, stationary positions.

To provide for a more efficient reciprocal movement of the press 210, section B of FIG. 8 illustrates a compressed air cushion supplied from line 239, and regulated by a valve 240 to lines 241 which provide an air cushion to the bottom of the cutting means 210.

From the foregoing, the details of construction not discussed specifically will be apparent to those skilled in the art as well as any suitable means for performing the described functions may be employed. Instead of a roll formed stock, easily deformable strips of materials such as metal or plastic may be accurately and reproducibly severed. It will also be apparent that the cutting means can be replaced with any machinery for performing a desired machining operation on the moving stock piece. A pin clutch in combination with a mechanical acceleration means could be employed in place of the pneumatic or hydraulic acceleration means discussed herein.

Although the invention has been described in terms of specific preferred structure, it will be obvious to one skilled in the art that all such modifications and alterations be included within the scope of the invention as defined by the appended claims.

What is claimed is:

1. In a cut-off press for cutting a determined length segment from a stock piece which continuously moves in a forward direction through the press and which has a series of indices spaced at predetermined intervals along the stock piece, each of said indices having a forward surface and a rearward surface, the cut-off press having a cutting means associated with a pick up means, said pick up means repeatedly engaging and disengaging from the indices, and wherein the pick up and cutting means are first accelerated in the direction of the movement of the stock piece from a stationary position to a second position during a period of time in which the pick up means is engaged with an indice and the segment is cut from the stock piece and then, with the pick up means disengaged from the stock piece, the cutting and pick up means are reciprocally returned in the opposite direction to their respective first positions, the improvement comprising:

means for accelerating the cutting and pick up means from their respective first positions upon positive engagement of said pick up means with said indice to a speed greater than that of the moving stock piece until the pick up engages the forward side of the indice; and means for controlling the acceleration means to maintain a speed of the cutting and pick up means equal to that of the moving stock piece after the pick up has engaged the forward side of the indice and for controlling the force exerted by the pick up means on the forward surface of the indice until their respective second positions are reached.

2. The improvement in a cut-off press according to claim 1 wherein the acceleration means further includes:

a fluid operated acutator means in fluid communication with the acceleration rate controlling means for reciprocally moving the cutting and pick up means from their first to their second positions in response to positive engagement of the pick up means with the engaged indice and to return the cutting and pick up means to their first positions in response to the cutting means cutting the segment from the moving stock.

3. The improvement in a cut-off press according to claim 2 wherein the acceleration and force controlling means further includes:

a valve means associated with the fluid stream for selectively purging excess fluid from reaching the actuator means during movement of the cutting and pick up means from their first to their second respective positions so that a selected amount of the fluid stream reaches the actuator means.

4. The improvement in a cut-off press according to claim 1 wherein the pick up means further includes:

a bracket which couples the cutting means with the pick up means;

a base platform mounted on the bracket;

means for defining a pre-travel slide path on the platform;

a slide plate slidably mounted and biased in the slide path means for reciprocal and parallel motion from a null position to an extended position and back to the null position on the platform relative to the moving stock piece;

means for guiding the moving stock piece mounted to the base platform; and a pick up member for engagement with and disengagement from the indices in the stock piece mounted on the slide plate so that the slide plate can move from its null position to its extended position in the same direction as the stock when the pick up member first engages one of the indices until the rate of acceleration of the cutting and positive engagement means has reached a speed great enough to permit the slide plate to return to its null position in the opposite direction.

5. An improved apparatus for cutting a determined length segment from a stock piece which continuously moves in a forward direction and which has a series of indices spaced at predetermined intervals along its length for individually defining a forward and rearward surface, said apparatus comprising:

means movable between first and second predetermined positions for cutting the stock;

a pick up means associated with said cutting means and movable between first and second predetermined positions in a spaced relationship from said cutting means, and for repeated engagement with and disengagement from the indices;

means for reciprocally accelerating the cutting and pick up means in a cycle, from their respective first positions to their respective second positions in the direction of the stock piece, during which the pick up means is engaged with one of the indices and the cutting means severs the determined length from the stock, and for returning the pick up and cutting means to their respective first positions in a direction opposite to the direction of the moving stock, during which the pick up means is disengaged from the indices;

means for selectively controlling the accelerating means to produce a rate of acceleration of said cutting and pick up means such that the pick up means is engaged with the forward surface of an engaged indice at the respective second positions of the cutting and pick up means; and whereby the stock piece is repeatedly cut into segments of the determined length in going from their first to their respective second positions of the cutting and pick up means.

6. The apparatus of claim 5 further comprising:

means responsive to engagement of the pick up means with one of the indices for actuating the acceleration means to begin the cycle by accelerating the cutting and pick up means from their first to their second positions in the same direction as the engaged indice in the moving stock; and means for actuating the cutting means to cut the part, and for disengaging the pick up means from the engaged indice, and for signaling the acceleration means to return the cutting and pick up means to their first respective positions to complete the cycle of reciprocal acceleration.

7. The apparatus of claim 5 further comprising:

means for supporting the cutting and pick up means on a horizontal surface during their cycles of reciprocal acceleration; and means for substantially reducing friction between the reciprocating cutting means and the horizontal surface.

8. The apparatus of claim 5 wherein the pick up means further includes:

a bracket which couples the cutting means with the pick up means;

a base platform mounted on the bracket;

means for defining a pre-travel slide path on the platform;

a slide plate slidably mounted and biased in the slide path means for reciprocal and parallel motion from a null position to an extended position and back to the null position on the platform relative to the moving stock piece;

means for guiding the moving stock piece mounted to the base platform; and a pick up member for engagement with and disengagement from the indices in the stock piece mounted on the slide plate so that the slide plate can move from its null position to its extended position in the same direction as the stock when the pick up member first engages one of the indices until the rate of acceleration of the cutting and positive engagement means has reached a speed great enough to permit the slide plate to return to its null position in the opposite direction.

9. The apparatus of claim 5 wherein the reciprocally accelerating means includes:

a fluid operated actuator means in fluid communication with the acceleration rate controlling means for reciprocally moving the cutting and pick up means from their first to their second positions in response to positive engagement of the pick up means with the engaged indice and to return the cutting and pick up means to their first positions in response to the cutting means cutting the segment from the moving stock.

10. The apparatus of claim 9 wherein the means for selectively controlling the acceleration rate includes:

a valve means associated with the fluid stream for selectively purging excess fluid from reaching the actuator means during movement of the cutting and pick up means from their first to their second respective positions so that a selected amount of the fluid stream reaches the actuator means.

11. An improved apparatus for cutting a determined length segment from an easily deformable stock piece which continuously moves in a forward direction and which has a series of indices spaced at predetermined intervals along its length for individually defining a forward and rearward surface, said apparatus comprising:

means movable between first and second predetermined positions for cutting the stock;

a pick up means coupled to said cutting means and movable with the cutting means in a horizontally and longitudinally spaced relationship for repeated engagement with and disengagement from the indices;

a fluid operated piston in a cylinder for reciprocally accelerating the cutting and pick up means in a cycle from the first position to the second position in the direction of the stock piece during which movement the pick up means is engaged with one of the indices, and for returning the pick up and cutting means to the first position in a direction opposite to the direction to the moving stock during which movement the pick up means is disengaged from the indices;

means cooperating with the piston and cylinder for reversibly and selectively controlling a stream of fluid to operate on one side of the piston to move the cutting and pick up means from the first to the second position in the direction of the stock piece in response to positive engagement of the pick up means with the engaged indice, and for reversing the fluid stream to operate on the other side of the piston to return the cutting and pick up means to the first position in response to the cutting means cutting the length segment; and a selectively controllable valve in fluid communication with the fluid stream for selectively purging excess fluid from operating on the piston during movement from the first to the second position so that the rate of acceleration of the cutting and pick up means is controlled such that the pick up means in engaged on the forward surface of an indice when the cutting means cuts the stock piece; whereby the stock piece is accurately and repeatedly cut into segments of the determined length.

12. A method of cutting a part from a stock piece continuously moving in a forward direction which has a series of spaced indices, each of said indices having a forward and a rearward surface, by a cut-off press comprising the following steps:

accelerating the press in the direction of the stock piece and controlling the rate of acceleration so that the press is moving faster than the speed of the stock piece until one of the indices is engaged on its forward surface by a pick up means spaced from the press and then maintaining a force so that the press is in pulling engagement with the indice;

cutting the part from the stock piece;

disengaging the pick up means from the moving stock piece; and returning the press in the opposite direction of the moving stock piece.

13. The method of claim 12 including the further steps of:

engaging the indice in the moving stock piece by the pick up means; and accelerating the press from a selected stationary position in the direction of the moving stock piece.

* * * * *